Figure 1:
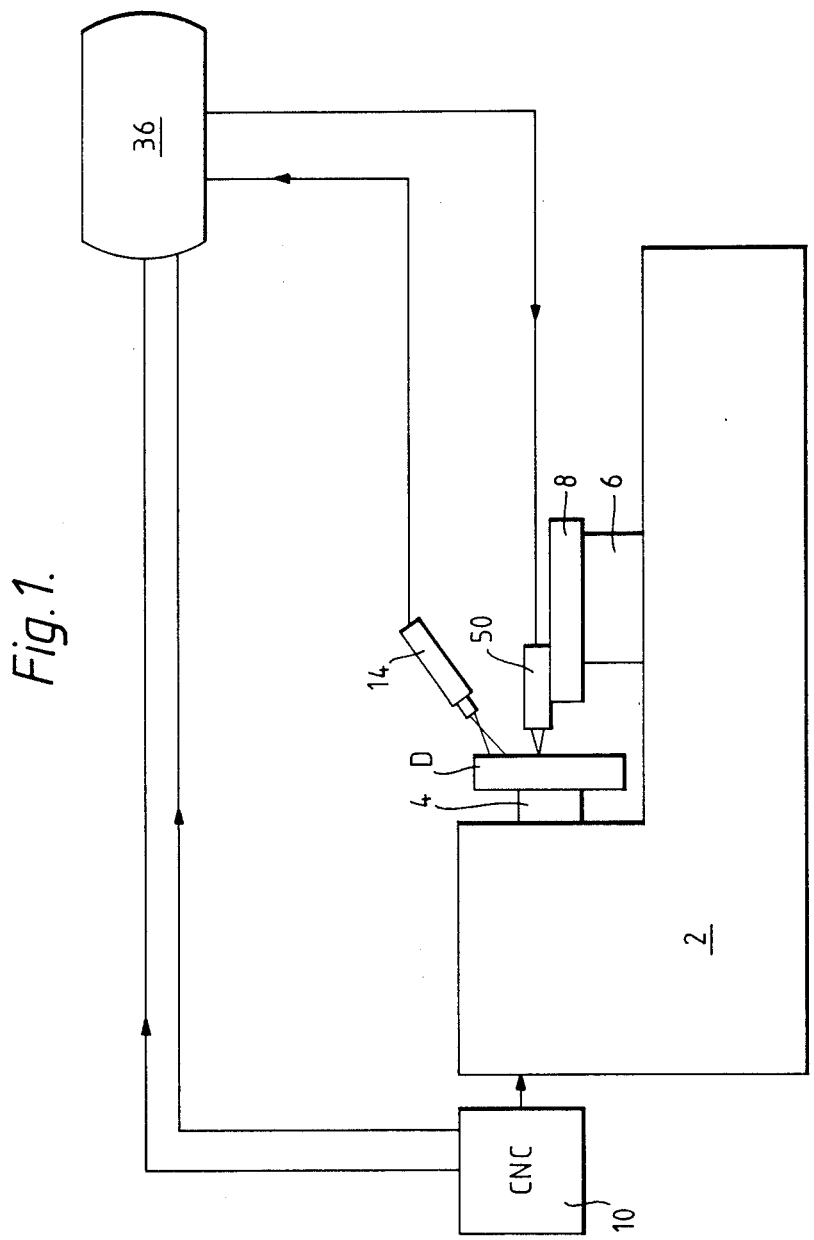

United States Patent [19]

Cartlidge et al.

[11] Patent Number: 4,916,293
[45] Date of Patent: Apr. 10, 1990

[54] IDENTIFICATION IN MANUFACTURE

[75] Inventors: Andrew G. Cartlidge, Alvaston; Eric Warren, Etwall, both of England

[73] Assignee: Rolls-Royce plc, London, United Kingdom

[21] Appl. No.: 130,325

[22] Filed: Dec. 8, 1987

[30] Foreign Application Priority Data

Feb. 25, 1987 [GB] United Kingdom ................. 8704474

[51] Int. Cl.⁴ ............................................. G06F 15/20
[52] U.S. Cl. .................................... 235/375; 235/376; 235/432; 358/101; 364/474.01
[58] Field of Search ....................... 235/375, 376, 432; 358/101; 364/474.01

[56] References Cited

U.S. PATENT DOCUMENTS

| 4,588,880 | 5/1986 | Hesser | 235/376 |
| 4,656,510 | 4/1987 | Mattila | 358/101 |
| 4,760,247 | 7/1988 | Keane et al. | 235/375 X |

Primary Examiner—David L. Trafton
Attorney, Agent, or Firm—Cushman, Darby & Cushman

[57] ABSTRACT

A method of identifying a workpiece in the course of its manufacture, in which the workpiece carrying an existing identification marking is supplied to an apparatus in which it is to be subject to a process that removes or obscures the marking, the marking is machine-read after the workpiece has been placed in the apparatus but before the process begins, data from the reading is put in store, and at the end of the process the identification is re-marked on the workpiece in accordance with the stored data while the workpiece is retained in a predetermined position in the apparatus.

12 Claims, 3 Drawing Sheets

| DATUM | 1 CHARACTER CODE | | | | 2 CHARACTER CODE | | | | |
|---|---|---|---|---|---|---|---|---|---|
| CYCLIC REDUNCY CHECK | 1 CHAR<sup>R</sup> AUDIT | 2 CHAR<sup>R</sup> AUDIT | 3 CHAR<sup>R</sup> AUDIT | 4 CHAR<sup>R</sup> AUDIT | 5 CHAR<sup>R</sup> AUDIT | 6 CHAR<sup>R</sup> AUDIT | 7 CHAR<sup>R</sup> AUDIT | 8 CHAR<sup>R</sup> AUDIT | C.R.C. AUDIT |
| 3 CHARACTER CODE | | | | | 4 CHARACTER CODE | | | | PREFIX |
| 5 CHARACTER CODE | | | | | 6 CHARACTER CODE | | | | |
| 7 CHARACTER CODE | | | | | 8 CHARACTER CODE | | | | DATUM |

IDENTIFICATION IN MANUFACTURE

This invention relates to the identification of workpieces in the course of manufacture.

It is often required for components to be individually identified as they pass through a series of manufacturing stages so that a history of their manufacture is available for reference. For certainty of identification it is obviously better to mark the workpiece itself, but there are many manufacturing processes which inevitably result in removal or obiteration of an identification marking that has been placed on its surface. In these cases, the workpiece must be re-marked but, as well as the inconvenience and cost of including a further handling stage during manufacture, there is the risk of misidentification unless procedures are carefully controlled and all risk of human error is excluded.

The present invention is concerned with an improved method and apparatus for putting identifying markings on workpieces during manufacture.

According to one aspect of the invention, a method is provided in which, when a workpiece carrying an identification marking is supplied to an apparatus in which it is to be subject to a process that removes or obscures the marking, the marking is machine-read after the workpiece has been placed in the apparatus but before the process begins, data from the reading is put in store, and at the end of the process the identification is re-marked on the workpiece in accordance with the stored data while the workpiece is retained in a predetermined position in the apparatus.

According to another aspect of the invention, there is provided means for identifying a workpiece in the course of its manufacture, comprising reading means for reading a pre-existing identification marking on the workpiece, data storage means for storing said reading, marking means for applying identification markings connected to said storage means to be operable in accordance with the stored data of the pre-existing marking, and control means being provided for actuating said reading means before a process is performed on the workpiece in which the pre-existing marking is removed or obscured, and actuating said marking means after the end of said process to re-apply the marking from said stored data.

According to a further aspect of the invention, there is provided a machine tool having computer numerical control means for performing a manufacturing process on a workpiece, and further comprising means for reading a pre-existing identification marking on the workpiece and means for applying identificiation markings, the control means being arranged to actuate said reading means before the beginning of said process to read the pre-existing marking and store data from said reading during the process, and to actuate the marking means after the completion of said process in accordance with the stored data in order to reapply the marking to the workpiece before downloading the workpiece.

Conveniently, dot matrix identification markings are used, being robust and capable of being designed to minimise susceptibility to reading error as well as being able to be read by non-contacting, in particular optical, reading means with considerable tolerance in the position of the marking relative to the reading means. Moreover, such markings can easily be applied in situ at the machine tool by compact and robust devices. The re-application of a marking may, if more convenient, be at a different location on the workpiece. It is also possible for the workpiece to carry a number of markings at different locations at some stage in its manufacture, e.g. if a number of later stages in the manufacturing process access to one or other of the locations is impractical.

In the application of the method according to the invention to a workpiece in a machine tool, such as a machining centre, the machine tool can be provided with a video camera for reading the marking and a dot marker for replacing the obliterated marking in the same or in a different place on the workpiece, the dot marker preferably being mounted on an anciliary working station of the machine tool, for example on the tool post of the machining centre.

The invention can be well adapted to be used in CNC machine tools. The reading and re-marking of the workpiece identification can then be actuated, without human intervention, by the machine tool control in a pre-programmed sequence with the relevant process stage without disturbance to the work flow and without the risk of misidentification. Since each workpiece is individually identified in the course of its treatment by a machine tool, the method is also suited to flexible manufacturing systems.

Figures 2, 3:
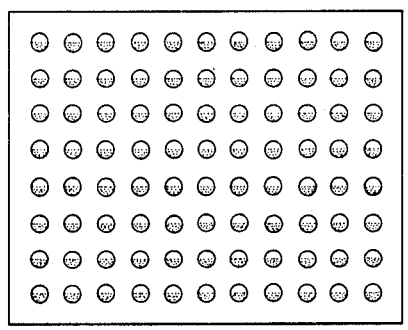
Figure 4:
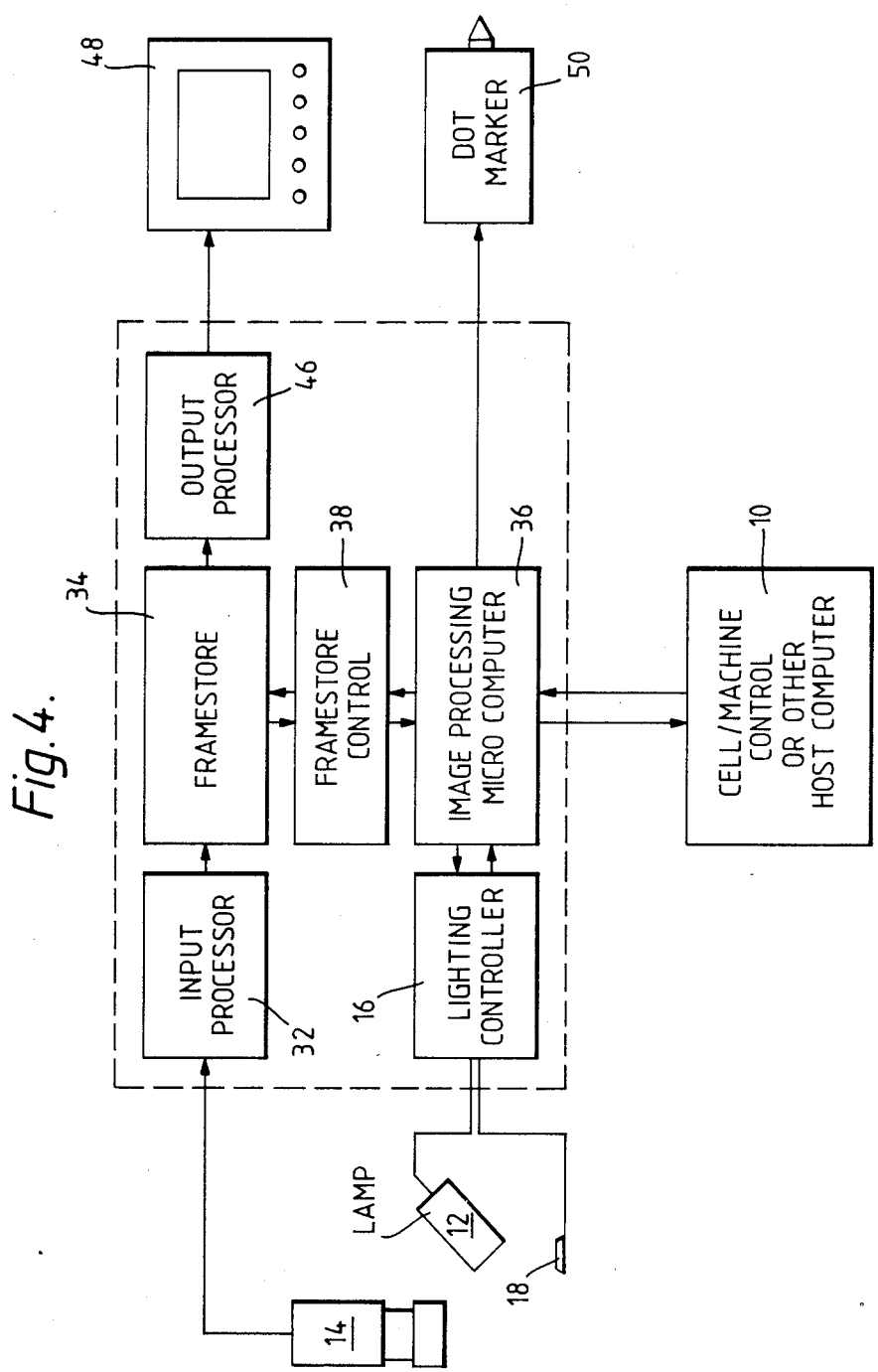

An example of the invention is illustrated in the accompanying drawings, in which:

FIG. 1 is a schematic illustration of the invention as applied to a CNC machine tool, FIG. 2 shows a dot matrix for a workpiece identification code, FIG. 3 illustrates the pattern of code elements within the matrix of FIG. 2, and FIG. 4 is a schematic illustration of the system provided for reading and storage of the dot matrix marking.

In FIG. 1 the machining centre 2 can of conventional form, with a rotary chuck for holding a workpiece such as the disc D shown, and a tool slide 6 provided with an indexable tool post 8 carrying one or more cutting tools (not illustrated) for machining the disc. A computer numerical control system 10 is used to control the operation of the machine tool, including the loading and unloading of workpieces as well as the machining sequence.

At an earlier stage in the manufacture of the disc an identification marking has been applied to its surface, of a kind that can be read by a non-contacting reading method. Optical identification by means of a dot matrix is a particularly suitable method (see "Automated Visual Inspection" pages 517–521, by Batchelor, Hill & Hodgson, IFS, 1985). Although it may be possible in many cases to employ simpler codes, depending upon the extend of the manufacturing system to which the identification method is applied, with an 8×11 dot matrix as illustrated in FIG. 2, it is possible to construct an 8-figure character code with audit elements that allow automatic determination of the code despite some degradation of the image, e.g. due to mechanical damage or the presence of foreign matter.

FIG. 3 illustrates a preferred pattern of code elements in the matrix of FIG. 2. Each character of the identification is represented by a character code which is complemented by its own audit code so that a reading error in the character code can be corrected. The 4-dot audit code pattern provides a single-error correcting capability for each character. To prevent a double error representing itself as an absence of error or a single correctable error, a cyclic redundancy check, using the character code bits only, is able to confirm the integrity of the reading. The cyclic redundancy check is itself composed of an 8-bit word and a 4-bit audit code which permits correction of a single error in its reading. Finally, a pair of datum points are shown, from which the orientation of the code is determinable.

The dot matrix M is punched into a convenient surface of the disc, possibly in a number of places so that the code is readable in different machine tools where the accessibility of its surfaces may differ. Because of the provision of the datum points in the dot matrix, the reading can be made in any angular orientation of the matrix in the reading plane.

Additionally provided on the lathe are a lamp 12 (FIG. 4) for illuminating the pre-existing dot matrix on the disc when it is loaded in the lathe, and a video camera 14 for reading the illuminated marking. The lamp is set at a low angle of incidence to the surface, to increase the contrast of the dots, and is provided with an illumination intensity control 16 responsive to an input from a photo detector 18 to stabilise the video camera image. The live picture in the camera 14 may be captured before image processing so that the machining operation can begin while the workpiece identification data is being processed. The system described is not only able to accept variations in angular orientation of the marking relative to the camera but can also tolerate translation variations of position dependent on the field of view of the camera.

As shown in FIG. 4, the camera input is converted into digital form by input processor 32 and then stored in a frame store 34 where the picture is progressively built up raster-style. The digitised image is also outputted through output processor 46 to monitor 48. A micro computer 36, which will usually be an additional unit but in limited applications can be part of the machine tool CNC, controls the operation of frame store 34 through control registers 38.

The computer 36, under the command of the machine numerical control 10 when the surface to receive the replica code has been machined, outputs the stored identity code data to a dot marker 50 mounted on the tool post 8, using a data link (not shown), e.g. an infra red transmission. Power is provided for the dot marker either through another radiation input or through an internal power source such as a battery, whereby the punch elements of the marker are set to the identification code and the punch is operated to impress the code marking into the machined surface of the disc. The dot marking applied at this stage can include additional information, e.g. to indicate a tolerance band of the workpiece resulting from the machining operation in order to assist matching of components on assembly.

A flow line process can be operated using the invention in which workpieces are automatically transferred between manufacturing stages at each of which the reading of the marking triggers the required operation. The control program is so arranged that if the identification marking is not read when the workpiece is located in a machine tool the process can proceed no further. The method is therefore fail-safe.

If required, the component identification held in the frame store can also be used for automatic storage of the manufacturing history of the workpiece and for purposes of work flow control within the manufacturing facility. Additional data may be stored and collected, e.g. to provide a record of trends and concessions, and more generally to provide management information.

We claim:

1. A method of identifying a workpiece in the course of its manufacture, in which the workpiece carrying an existing identification marking is supplied to an apparatus in which it is to be subject to a process that removes or obscures the marking, the marking is machine-read after the workpiece has been placed in the apparatus but before the process begins, data from the reading is put in store, and at the end of the process the identification is re-marked on the workpiece in accordance with the stored data while the workpiece is retained in a predetermined position in the apparatus.

2. A method according to claim 1 wherein the marking is read by an optical reading process.

3. A method according to claim 2 wherein the marking is read optically, an image of the reading is held in a frame store and is converted to digital data which is inputted to a digital data store while said manufacturing process on the workpiece begins.

4. A method according to any one of claim 1, 2 or 3 wherein the marking is in the form of a dot matrix.

5. A method according to claim 1 wherein the manufacturing process if performed in a CNC machine tool and said reading and re-application of the marking is controlled by the machine tool in sequence with the manufacturing process.

6. A method according to claim 1 wherein a plurality of corresponding markings are applied at different positions on the workpiece.

7. Means for identifying a workpiece in the course of its manufacture, comprising reading means for reading a pre-existing identification marking on the workpiece, data storage means for storing said reading, marking means for applying identification markings connected to said storage means to be operable in accordance with the stored date of the pre-existing marking, and sequencing means being provided for actuating said reading means before a process is performed on the workpiece in which the pre-existing marking is removed or obscured, and actuating said marking means after the end of said process to re-apply the marking from said stored data.

8. Means according to claim 7 comprising a video camera for reading the pre-existing marking optically.

9. Means according to claim 8 wherein a frame store is arranged to hold the camera image means are provided for producing processed digital signals of the camera image of said marking for input to the frame store.

10. Means according to any one of claims 7, 8 or 9 comprising a dot marking device for the reapplication of the identification marking after completion of said process.

11. Means according to claim 7 wherein the marking means has an internal power supply for its operation and a radiation communication link is provided for controlling the operation of the marking means.

12. A machine tool having computer numerical control means for performing a manufacturing process on a workpiece, the machine tool further comprising means for reading a pre-existing identification marking on the workpiece and means for applying identification markings, the control means being arranged to actuate said reading means before the beginning of said process to read the pre-existing marking and store data from said reading during the process, and to actuate the marking means after the completion of said process in accordance with the stored data in order to re-apply the marking to the workpiece before downloading the workpiece.

* * * * *